March 11, 1969 P. LUDFORD 3,432,142
VENTILATING VALVES FOR VEHICLES
Filed May 23, 1966
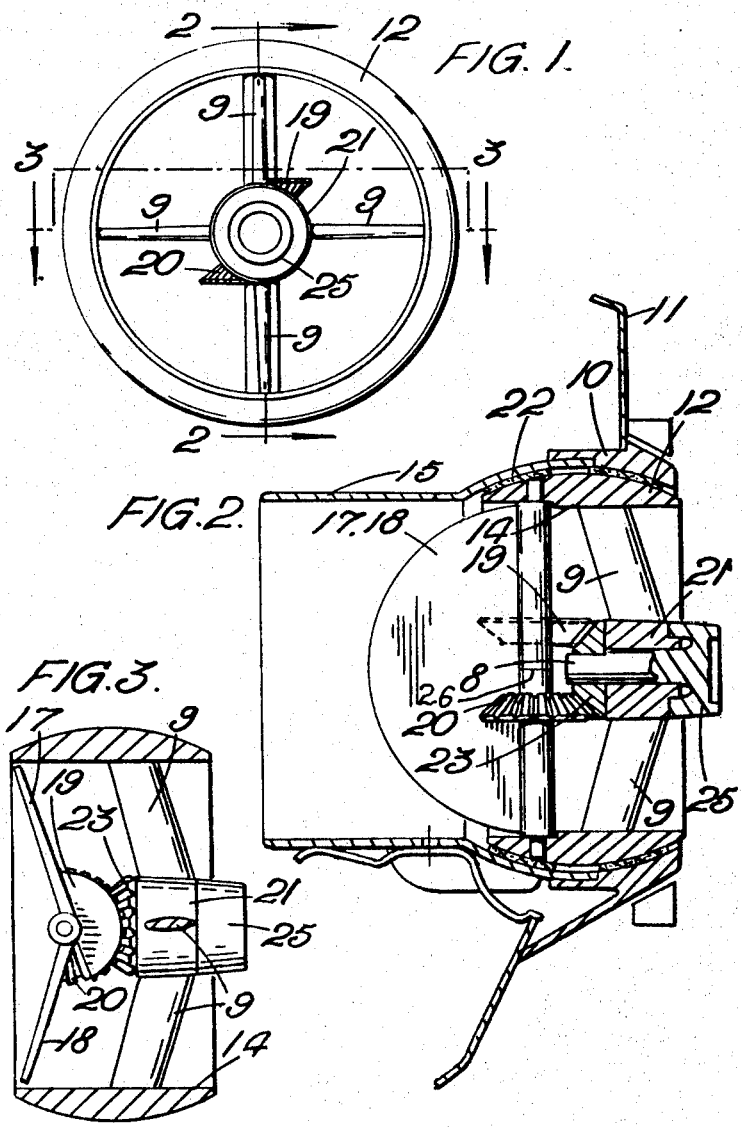

United States Patent Office 3,432,142
Patented Mar. 11, 1969

3,432,142
VENTILATING VALVES FOR VEHICLES
Peter Ludford, Coventry, England, assignor to Humber
Limited, a British company
Filed May 23, 1966, Ser. No. 552,128
Claims priority, application Great Britain, May 25, 1965,
22,191/65
U.S. Cl. 251—212
Int. Cl. F16k 1/22
1 Claim

ABSTRACT OF THE DISCLOSURE

A valve for regulating air flow comprising a part-spherical housing located in a part-spherical mounting, the housing having a throughway in which two flaps are mounted for rotation about an axis extending across the throughway the flaps being capable between them of closing the throughway. Each flap is formed with a bevel gear and extending into the throughway is a hollow cylindrical projection mounted on bars extending inwardly from the wall of the throughway in which projection a manually operable spindle is located at one end of the spindle extending out of the throughway and being formed with a knurled knob and the other end of the spindle located in the throughway being formed with a bevel gear which engages with the bevel gears on the flaps so that rotation of the spindle rotates the flaps in opposite directions.

---

The invention relates to valves and more particularly but not exclusively to valves for regulating the flow of ventilating air in vehicles.

The invention provides a valve comprising a housing, having a throughway, two flaps mounted in the housing for rotation about axes extending across the throughway, the two flaps being capable between them of closing the throughway and means to open and close the throughway which comprises a manually operable spindle mounted in the housing for rotation about an axis extending along the throughway, gear teeth on the flaps respectively and gear teeth on the spindle engaged thereby, the teeth being arranged and constructed so that rotation of the spindle causes the flaps to rotate, in unison, in opposite directions.

Preferably the passageway is circular, the flaps are semi-circular and are each mounted for rotation about an axis extending diametrically across the passageway.

It is preferred that the gear teeth comprise a first bevel gear on the spindle in engagement with bevel gears attached to the flaps respectively, concentric with the axes of their respective flaps, and one on each side of the first bevel gear.

The flaps may be rotatable about a common axis.

In one embodiment the housing is part-spherical in external cross-section and is received in a part-spherical mounting, the housing being manually movable to vary the direction of the passageway relative to the mounting.

A specific example of a valve according to the invention will now be described with reference to the accompanying drawings in which:

FIGURE 1 is a front view of the valve,

FIGURE 2 is a section on the line A–A in FIGURE 1, and

FIGURE 3 is a section along the line C—C in FIGURE 1.

The valve comprises a partspherical mounting 10 which is built into the facia panel 11 of a motor vehicle. Rotatable within the mounting 10 there is a housing 12 with a part-spherical outer surface and with a passageway 14 for ventilating air for the vehicle. There are felt strips 22 and 24 between the mounting and the housing. The ventilating air is fed through a duct 15 which is connected to the usual car heater or car ventilation system.

An axle 16 is clipped into position in the housing 12 and on the axle 16 there are mounted two semi-circular flaps 17 and 18 the division between the mountings of the flaps being indicated at 26. The flap 17 carries a bevel gear 19 and the flap 18 carries a bevel gear 20.

Extending into the passageway 14 in the housing 12 there are four bars 9 and these support a cylindrical projection 21. Mounted for rotation on the projection 21 there is a valve control spindle 8 with a knurled knob 25 at one end and at the other end a bevel gear 23 which engages with the gears 19 and 20. The knurled knob 25 is suitable for manual operation.

The arrangement of the gears on the plates 17 and 18 and on the control spindle is such that rotation of the control spindle in a clockwise direction moves the flaps 17 and 18 to a position where they are side by side in the centre of the passageway 14 with the passageway fully open and rotation of the control wheel in an anti-clockwise direction rotates the two flaps to the position shown in FIGURE 3 where the plates are completely closing the passageway 14. Of course the flaps can be adjusted to lie in any position intermediate between the open and closed positions.

I claim:

1. A valve for regulating ventilating air in a vehicle, said valve having:
    (a) a housing of part-spherical external cross-section,
    (b) said housing having a circular cross-section passageway with an inlet at one end and an outlet at the other end,
    (c) an axle extending diametrically across the passageway,
    (d) two flaps of semi-circular cross-section mounted for rotation on the axle,
    (e) a hollow cylindrical projection mounted concentrically in the passageway on a plurality of bars extending inwardly from the wall of the passageway,
    (f) a manually operable spindle rotatable in the projection and having a portion projecting from the outlet end of the passageway,
    (g) a first bevel gear on the end of the spindle remote from said outlet end,
    (h) bevel gears attached to the flaps concentric with the axle one diametrically on each side of the first bevel gear and in engagement therewith, and
    (i) a mounting of part-spherical internal cross-section to mount the housing for rotation in any sense and providing an extension from the inlet side of the passageway for connection of an inlet pipe.

References Cited

UNITED STATES PATENTS

| | | | |
|---|---|---|---|
| 1,125,503 | 1/1915 | Fleck et al. | 251—212 X |
| 1,474,211 | 11/1923 | Schoff | 251—212 X |
| 1,659,880 | 2/1928 | Kauffman | 251—212 |
| 2,596,869 | 5/1952 | Ross | 98—40 |
| 2,735,353 | 2/1956 | Griner | 98—41 |
| 3,147,768 | 9/1964 | Kennedy | 137—601 |

FOREIGN PATENTS 781,373   8/1957   Great Britain.

M. CARY NELSON, *Primary Examiner.*
R. C. MILLER, *Assistant Examiner.*